United States Patent
Piret

[11] 3,744,605
[45] July 10, 1973

[54] CLUTCH OR BRAKE DEVICE FOR AN AUTOMATIC TRANSMISSION

[75] Inventor: Jean Piret, Bougival, France

[73] Assignees: Automobiles Peugeot, Paris; Regie Nationale Des Usines Renault, Billancourt, both of France

[22] Filed: Oct. 12, 1971

[21] Appl. No.: 188,220

[30] Foreign Application Priority Data
Nov. 4, 1970 France .............................. 7039716

[52] U.S. Cl. .......... 192/70.2, 188/71.5, 192/85 AA, 287/53 SS
[51] Int. Cl. ..................... F16d 13/52, F16d 13/68
[58] Field of Search ....................... 192/70.13, 70.2, 192/85 AA; 74/446; 29/159.2; 188/71.1, 71.5, 73.3; 287/52.04, 53 SS

[56] References Cited
UNITED STATES PATENTS

| | | | |
|---|---|---|---|
| 3,081,854 | 3/1963 | Snyder | 192/85 AA X |
| 322,667 | 7/1885 | Wilson, Sr. | 29/159.2 |
| 866,364 | 9/1907 | Hutchins | 74/446 X |
| 1,156,582 | 10/1915 | Biggar | 287/52.04 |
| 1,495,604 | 5/1924 | Lipe et al. | 192/70.13 |
| 1,732,965 | 10/1929 | Carhart | 192/70.2 |
| 2,345,037 | 3/1944 | Gray | 285/286 X |
| 2,923,166 | 2/1960 | Brindley et al. | 74/447 X |
| 3,230,616 | 1/1966 | Janssen | 29/159.2 X |

FOREIGN PATENTS OR APPLICATIONS

954,134    4/1964    Great Britain .................... 192/70.2

Primary Examiner—Allan D. Herrmann
Attorney—Burns, Doane, Swecker & Mathis

[57] ABSTRACT

Clutch or brake device for an automatic transmission comprising a support element such as a clutch drum having a cylindrical wall having splines and a clutch reaction plate carried by the support element. Localized welds fix the periphery of the plate to the splines of the support element.

6 Claims, 3 Drawing Figures

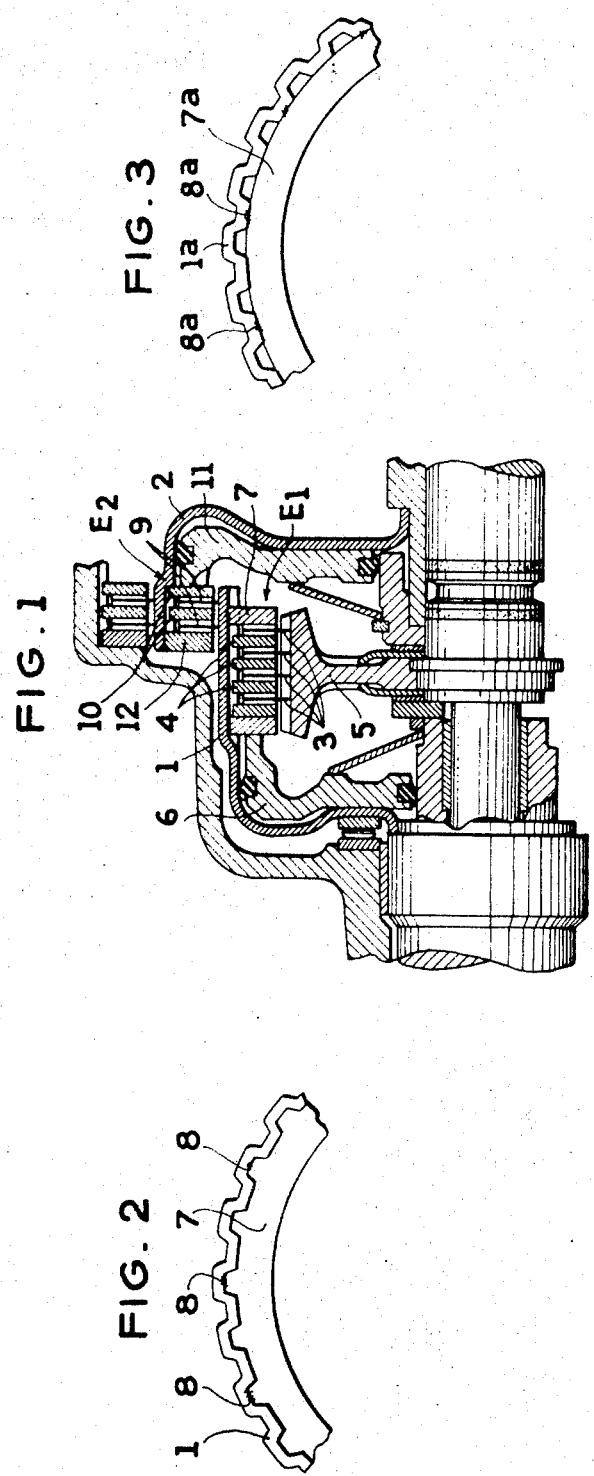

CLUTCH OR BRAKE DEVICE FOR AN AUTOMATIC TRANSMISSION

The present invention relates to automatic transmissions or gear boxes and more particularly to the mounting of the clutch reaction plates employed in such transmissions.

It is known that automatic transmissions or transmissions having an automatic control comprise brake and clutch devices whose selective actuation results in the required transmission ratio. These brakes or clutches comprise two alternating series of discs which are capable of being pressed against each other under the effect of the pressure exerted by the piston of a hydraulic actuating device and moreover bear against a reaction plate which is usually fixed in a detachable manner to a support element to which the discs of one of the two series of discs are keyed. Due to the fact that conventional automatic transmissions are complicated and expensive mechanisms it is considered absolutely essential that these mechanisms be capable of being dismantled so as to enable a damaged or worn part to be replaced. The reaction plate is consequently held in position on its support element by a resiliently yieldable ring or circlip which is received in a groove in the support element. Usually these support elements are constituted by relatively-thin pressed-out sheet-metal members, so that the groove receiving the resiliently yieldable ring is very shallow. Consequently, the machining of this groove and of the ring received therein must be extremely precise so that the ring does not disengage and escape from the groove under the effect of the force exerted on the reaction plate. It will be understood that a machine affording such precision is expensive as concerns both the tooling required and the operating time and this increases the cost of automatic transmissions.

An object of the invention is to remedy this drawback and provide an assembly between the reaction plate and its support element which is easy to achieve but which is nonetheless strong and performs in a satisfactory manner and is capable of being dismantled and a reassembled if desired.

The invention provides a clutch or brake device for an automatic transmission comprising a support element which is splined on its inner and/or outer periphery, and a clutch reaction plate carried by the support element, wherein said plate is fixed to the support element by means of localized welds arranged around the periphery of said plate.

According to one embodiment, the plate has teeth, known per se, which are adapted to the splines of the support element and the welds are made in the region of the crests of the teeth.

According to another embodiment, the plate has a smooth outer periphery and is welded to the crests of the inner splines formed in the support element.

Further features and advantages of the invention will be apparent from the ensuing description with reference to the accompanying drawing.

In the drawing :

FIG. 1 is a partial sectional view of an automatic transmission or gear box including the device according to the invention, and FIGS. 2 and 3 are respectively partial cross-sectional views of two devices according to the invention.

FIG. 1 shows a part of an automatic transmission or gear box having two support elements such as clutch drums 1 and 2 provided with splines in their lateral cylindrical walls. The two drums are of sheet metal and the splines are formed by a press operation on both the inner periphery and outer periphery, as can be seen in FIGS. 2 and 3.

A first clutch $E_1$ comprises two series of discs 3 and 4, the discs 3 of the first series being keyed to a flange 5 integral with an intermediate shaft of the transmission whereas the discs 4 of the second series are connected to rotate with the drum 1. This clutch $E_1$ is actuated by a hydraulic device having a piston 6 and the disc assembly bears against a reaction plate 7 which is welded to the drum, for example in the manner shown at 8 in FIG. 2.

In this embodiment, the reaction plate 7 has on its outer periphery teeth which are engaged in the splines of the clutch drum constituting a support element for the plate and the welds are made on every two or three teeth so as to achieve a suitable interconnection between the reaction plate and the drum.

A second clutch $E_2$ is disposed between the two drums 1 and 2 and also has two series of discs 9 and 10 respectively keyed to the drums 1 and 2. This clutch is actuated by a piston 11 and there is provided a reaction plate 12 which is also welded to the end of the drum 2. It will be observed that in the case of clutch $E_1$, the welds are effected through the cylindrical wall of the drum whereas in the case of the clutch $E_2$ these welds are effected at the end, for example by electron beam welding. It will be understood that any suitable welding process may be employed.

In the embodiment shown in FIG. 3, the production of the reaction plate 7a has been still further simplified by making this plate with a smooth outer wall, the welds being then made at 8a along the inner periphery of the drum 1a on the crests of the inner splines.

Bearing in mind that there is an ever-increasing tendency to standardize manufacture of automatic transmissions or gear boxes so as to reduce production costs, it may be considered that it is not essential that the reaction plate of the clutch be fixed to the drum in a detachable manner. Indeed, the labour costs for dismantling and replacing a damaged part may be at least as much as the cost of a sub-assembly constituted for example by the drum, the clutch and the actuating piston.

However, in the device according to the invention, it is possible, if desired, to achieve this dismantling in a simple manner notwithstanding the welded connection between the plate and the drum, since the localized or spot welds are not made on every tooth and spline of the drum and plate. Indeed, it is sufficient to machine, for example mill, the regions in which the welds are made. Fresh localized welds are effected after reassembly in the region of the teeth which had not been employed for the first welds. According to a modification, all the welds may be sheared off simultaneously by a press operation which eliminates the machining operation.

Having now descrived my invention what I claim and desire to secure by Letters Patent is :

1. A clutch or brake device for an automatic transmission, comprising a support element having a cylindrical wall and splines on a periphery of said cylindrical wall, a clutch reaction plate carried by said support element, and having peripheral portions engaging said splines, and localized discrete welds fixing said plate to said support element, said welds being arranged around said peripheral portions of said plate.

2. A device as claimed in claim 1, wherein said plate has teeth adapted to said splines, said teeth having crest portions engaging corresponding portions of said splines and said welds being made radially in the region of crest portions.

3. A device as claimed in claim 1, wherein said plate has a smooth outer periphery and said support element has inner splines on an inner periphery of said wall, said splines having inner crest portions, said outer periphery of said plate being welded to at least some of said inner crest portions.

4. A device as claimed in claim 1, wherein said welds are made through said wall of the support element.

5. A device as claimed in claim 1, wherein said welds are made through an end of said support element.

6. A device as claimed in claim 5, wherein said welds are made by an electron beam welding.

* * * * *